US006256750B1

(12) United States Patent
Takeda

(10) Patent No.: US 6,256,750 B1
(45) Date of Patent: Jul. 3, 2001

(54) INFORMATION PROCESSING APPARATUS, NETWORK PRINTING SYSTEM, ITS CONTROL METHOD, AND STORAGE MEDIUM STORING PROGRAM

(75) Inventor: Junichi Takeda, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/985,310

(22) Filed: Dec. 4, 1997

(30) Foreign Application Priority Data

Dec. 27, 1996 (JP) .................................................. 8-350180
Oct. 28, 1997 (JP) .................................................. 9-295521

(51) Int. Cl.[7] .................................................. G06F 11/00
(52) U.S. Cl. .................................................. 714/11
(58) Field of Search .................................. 714/37, 39, 49, 714/45, 51, 736, 11, 4; 395/671, 670, 672, 113, 114; 709/239

(56) References Cited

U.S. PATENT DOCUMENTS

| 4,800,488 | * | 1/1989 | Agrawal et al. ..................... 709/225 |
| 5,140,689 | * | 8/1992 | Kobayashi ............................. 714/20 |
| 5,157,663 | * | 10/1992 | Major et al. ........................... 714/10 |
| 5,220,674 | * | 6/1993 | Morgan et al. ...................... 709/223 |
| 5,333,314 | * | 7/1994 | Masai et al. .......................... 714/16 |
| 5,341,477 | * | 8/1994 | Pitkin et al. ......................... 709/223 |
| 5,396,613 | * | 3/1995 | Hollaar ................................... 714/4 |
| 5,434,994 | * | 7/1995 | Shaheen et al. .................... 709/223 |
| 5,437,031 | * | 7/1995 | Kitami ................................. 709/300 |
| 5,553,083 | * | 9/1996 | Miller .................................. 714/748 |
| 5,566,297 | * | 10/1996 | Devarakonda et al. .............. 714/15 |
| 5,583,986 | * | 12/1996 | Park et al. ............................. 714/4 |
| 5,588,148 | * | 12/1996 | Landis et al. .......................... 707/1 |
| 5,592,611 | * | 1/1997 | Midgely et al. ........................ 714/4 |
| 5,625,757 | * | 4/1997 | Kageyama et al. ................. 395/113 |
| 5,652,908 | * | 7/1997 | Douglas et al. ........................ 714/4 |
| 5,696,896 | * | 12/1997 | Badovinatz et al. .................. 714/4 |
| 5,761,396 | * | 6/1998 | Austin et al. ........................ 395/114 |
| 5,796,934 | * | 8/1998 | Bhanot et al. ......................... 714/4 |
| 5,828,847 | * | 10/1998 | Gehr et al. .......................... 709/239 |
| 5,845,076 | * | 12/1998 | Arakawa ............................. 709/203 |
| 5,852,724 | * | 12/1998 | Glenn, II et al. ................... 709/239 |
| 5,870,561 | * | 2/1999 | Jarvis et al. ........................ 709/238 |

FOREIGN PATENT DOCUMENTS

| 3-63161 | * | 3/1991 | (JP) ............................... B41J/29/38 |
| 8-166918 | * | 6/1996 | (JP) ............................... G06F/13/00 |

OTHER PUBLICATIONS

IBM Corporation, "OS/390 V2R4 JSE2 Introduction", Topics 1.0, 1990.*
IBM Corporation, "OS/390 V2R7.0 JES2 Initialization and Tuning Guide", Topics 2.1.5.14.1, 1988.*
IBM Corporation, "OS/390 V2R7.0 MVS Setting Commands", Topics 7.5, 1988.*
IBM Corporation, "OS/390 V2R7.0 JES2 Commands", Topics 5.129, 1988.*

* cited by examiner

Primary Examiner—James P. Trammell
Assistant Examiner—Pierre Eddy Elisca
(74) Attorney, Agent, or Firm—Fitzpatrick, Cella, Harper & Scinto

(57) ABSTRACT

The invention for printing by a printer in accordance with a requesting order of jobs from clients when an error occurs in a server or the server is shut-down. It is possible to reconstruct a print system in which each client computer spools print data, only job information is transmitted to the server, and the server performs an order control, wherein when an abnormality occurs in the server, the client computer set as a reserve server functions in place of the server and each client computer confirms whether the job registered by itself has correctly been registered or not, thereby enabling a printing process to be normally performed.

56 Claims, 14 Drawing Sheets

NETWORK PRINTER

INFORMATION PROCESSING APPARATUS, NETWORK PRINTING SYSTEM, ITS CONTROL METHOD, AND STORAGE MEDIUM STORING PROGRAM

BACKGROUND OF THE INVENTION

1. Field of the Invention

The invention relates to an information processing apparatus in which a printer connected to a network is connected to a plurality of networks, a network printing system using such an information processing apparatus, its control method, and a storage medium in which its control program has been stored.

2. Related Background Art

In recent years, personal computers in an office are remarkably spread and a network technique for connecting them is also developed. As a using method of a printer as well, hitherto, although one printer has been connected to one personal computer and used, in recent years, in many cases, printers are connected to a network and are commonly used by the personal computers connected to the network.

As an environment using a network printer, there are many cases where a network OS such as netware, Windows NT (registered trademark), or the like is used and a print server is set and used. In order to share the printer, however, a server has to be installed. Hitherto, even when there is a server, if a function of a print server is added, there is a problem such that the function of the conventional server is deteriorated.

To solve those problems, a virtual server system is considered. In the virtual server system, since the server does not receive print data from a client but executes only a control of a printing order of print jobs, a load as a print server is reduced and the deterioration of the function of the conventional server can be prevented.

In the above conventional apparatus, however, since a scheduling of jobs can be performed on a virtual print server in spite of a fact that a client has print data, there is a problem such that when the virtual print server fails, a print-out from the client cannot be performed. To solve it, a method of directly transmitting data to the printer from the client when a fault occurs in the server is considered. According to this method, however, the scheduling of the jobs is not performed.

SUMMARY OF THE INVENTION

In a virtual print server system, it is the first object of the invention to perform a network printing such that a scheduling of jobs can be performed even when a fault occurs in a server.

In a virtual print server system, it is the second object of the invention that even when a fault occurs in a server, a schedule of jobs before the occurrence of the fault can be used as it is in a network printing such that a scheduling of jobs can be performed.

In a virtual print server system, it is the third object of the invention that when a reserve server is prepared, even if a specific client is not operating, the reserve server is automatically designated.

In a virtual print server system, it is the fourth object of the invention that even when a power source of a client designated as a reserve server is turned off, another client can be designated as a reserve server.

In a virtual print server system, it is the fifth object of the invention that even when a server is restarted, print data which a client has is not abandoned but a network printing is executed by using it.

In a virtual print server system, it is the sixth object of the invention that even when a server is restarted, information to control a printing order before the restart is reconstructed and a network printing is performed by using it.

To accomplish the above objects, according to the first aspect of the invention, there is provided a virtual print server system in which one of clients is preset as a reserve server. When a fault occurs in the virtual print server, the client set as a reserve server plays a role of the server. When a fault occurs in the virtual print server, since the client set as a reserve server plays a role of the server, the client of the virtual print server system can print out from the network printer by using the reserve server.

According to the second aspect of the invention, the reserve server in the first aspect always gets print job information which the virtual print server has. When the reserve server is started, the job information managed by the previous server can be used as it is.

According to the third aspect of the invention, the setting of the reserve server in the first aspect is performed to all of the clients and the server detects the client whose power source is turned on for the first time and designates it as a reserve server. The reserve server can always exist in the virtual print server system.

According to the fourth aspect of the invention, when a fault occurs in the client designated as a reserve server in the third aspect, the server detects it and designates another client as a reserve server. Even if a fault occurs in the reserve server, an alternating reserve server can be set.

According to the fifth aspect of the invention, in a virtual print server system, when a fault occurs in a server, a client enters a stand-by mode for waiting for a restart of the server and, after the server was restarted, it collects print information from the client and reconstructs print management information. Even after the server was restarted, the client operates so that it can network print the print data as it is.

According to the sixth aspect of the invention, in a virtual print server system, a server always records print management information to a recording medium such as a hard disk or the like and, when a fault occurs in the server, a client enters a stand-by mode for waiting for a restart of the server, and after the server was restarted, it reads out the print management information from the recording medium and reconstructs print management information on the basis of it. Even after the server was restarted, the client operates in a manner such that printing order information before the fault occurs in the server is held and a network printing can be performed in accordance with the previous order.

DETAILED DESCRIPTION OF THE PREFERRED EMBODIMENTS (First Embodiment)

First embodiment of the invention will now be described hereinbelow with reference to the drawings.

Figure 1:
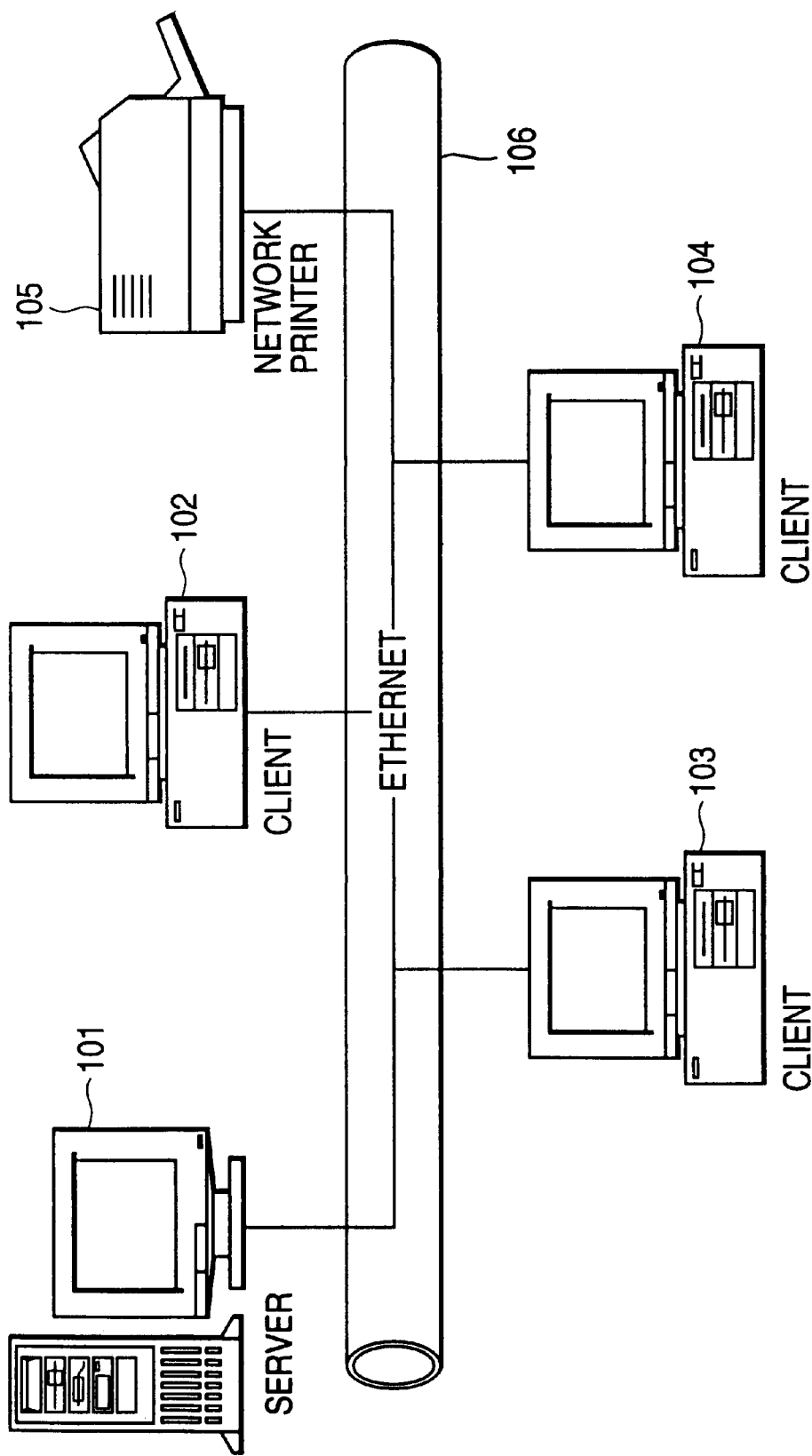
FIG. 1 is a system constructional diagram of a network system to which a virtual server according to an embodiment of the invention is applied.

FIG. 1 is a system constructional diagram of a network system to which a virtual server of the embodiment is applied.

In FIG. 1, it is now assumed that n client computers are connected. Reference numerals 102, 103, and 104 denote client computers serving as information processing apparatuses. The client computers are connected to a network 106 via a network cable. Each client computer can execute various programs such as an application program and the like and has a printer driver having a function to convert print data to a printer language corresponding to a printer. It is assumed that the printer driver supports a plurality of printer languages.

Reference numeral 101 denotes a server which is connected to the network 106 via the network cable, accumulates files which are used in the network, and monitors a using state of the network 106. The server 101 of the embodiment further has functions for storing job information of the print data in which a print request is issued from the client computers 102, 103, and 104 and notifying the client computers of IP information of a network printer 105 and information of jobs received in a buffer.

Reference numeral 105 denotes the network printer as an output apparatus. The network printer is connected to the network 106 through a network interface, converts the print data that is transmitted from the client computer to a dot image on a page unit basis, and prints it every page. Reference numeral 106 denotes the network connected to the client computers, server, network printer, and the like.

By divisionally performing roles by the server 101, client computers 102, 103, and 104, and network printer 105, the client computers are effectively used and a process to reduce a burden on the network is performed.

Figure 2:
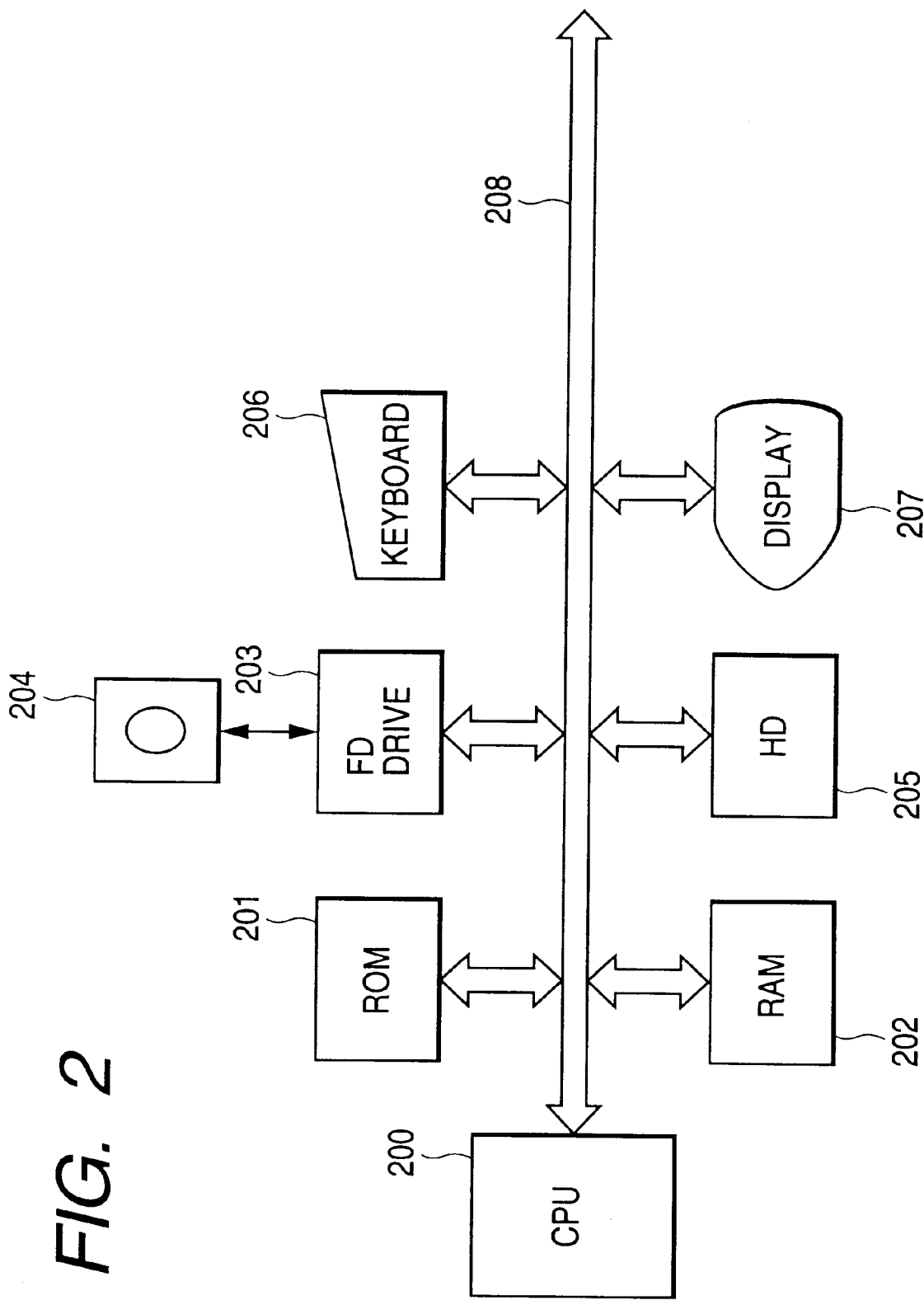
FIG. 2 is a block diagram showing a schematic construction of a client computer in FIG. 1.

FIG. 2 is a block diagram showing a schematic construction of the client computer 102 as an information processing apparatus. The client computers 103 and 104 also have the same construction as that of the client computer 102.

Reference numeral 200 denotes a CPU serving as control means. The CPU executes an application program, a printer driver program, an OS, a network printer control program, and the like stored in an HD (hard disk) 205 and performs a control to temporarily store information, files, or the like which is necessary to execute the program into an RAM 202.

Reference numeral 201 denotes an ROM serving as a storage medium (storing means). Programs such as a basic I/O program and the like and various data such as font data, data for template, and the like which are used for a document process are stored in the ROM 201.

Reference numeral 202 denotes the RAM serving as a storage medium (storing means) which functions as a main memory, a work area, or the like of the CPU 200. When the information processing apparatus functions as a server, job information transmitted from the client is stored in the RAM 202, a list for controlling the printing order of the CPU is formed and stored.

Figure 4:
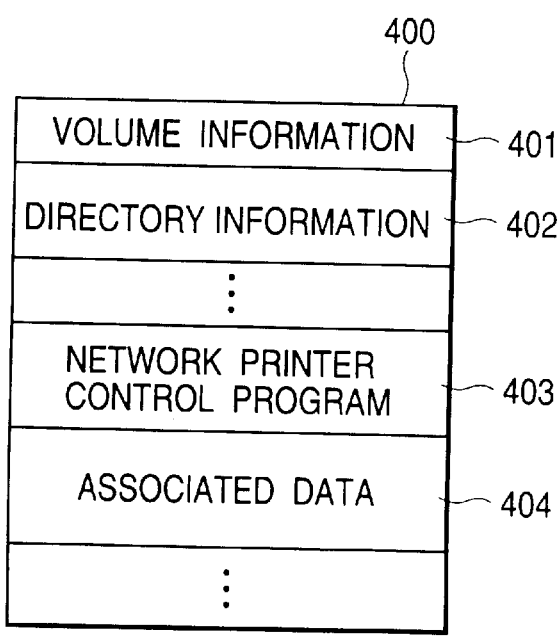
FIG. 4 is a memory map showing data in the FD in FIG. 2.
Figure 5:
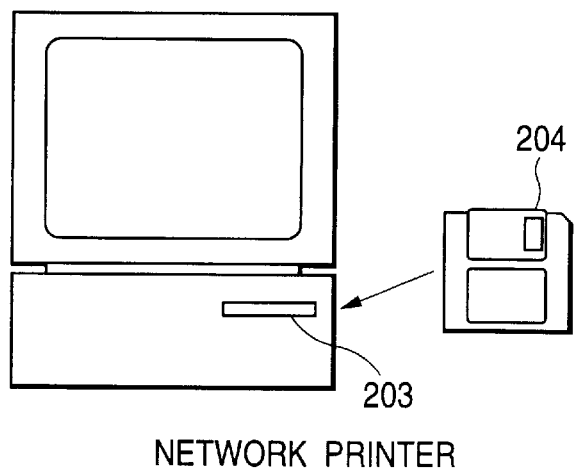
FIG. 5 is a diagram showing a relation between the client computer in FIG. 1 and the FD in FIG. 2.

Reference numeral 203 denotes an FD (floppy disk) drive. A program or the like stored in an FD 204 can be loaded into the computer system through the FD drive 203 as shown in FIG. 5. Reference numeral 204 denotes the FD in which the network printer control program and associated data, which will be explained in the embodiment, have been stored. FIG. 4 shows a construction of the contents stored.

In FIG. 4, reference numeral 400 denotes data contents in the FD 204; 401 volume information showing information of the data; 402 directory information; 403 a network printer control program, which will be explained in the embodiment; and 404 associated data thereof.

The network printer control program 403 is a program coded on the basis of a flowchart of a network printer control procedure shown in FIGS. 11 to 16.

Reference numeral 205 denotes the HD (hard disk) serving as spool means (storing means). The application program, printer driver program, OS, network printer control program, associated program, and the like have been stored in the HD. As will be explained later, when a print request is transmitted to the server, print data as actual print data has been stored in the HD.

Reference numeral 206 denotes a keyboard serving as input means. The user inputs and instructs a command such as a control command of a device or the like to the client computer by using the keyboard 206.

Reference numeral 207 denotes a display serving as display means for displaying the command inputted from the keyboard 206, a status of the printer, or the like. Reference numeral 208 denotes a system bus for transmitting data in the client computer.

The client computer which will be explained in the embodiment has an interface 209 serving as transmitting means and can input and output data to/from external equipment such as server, printer, or the like. Even if the interface 209 uses a network board, the invention can be embodied.

Figure 3:
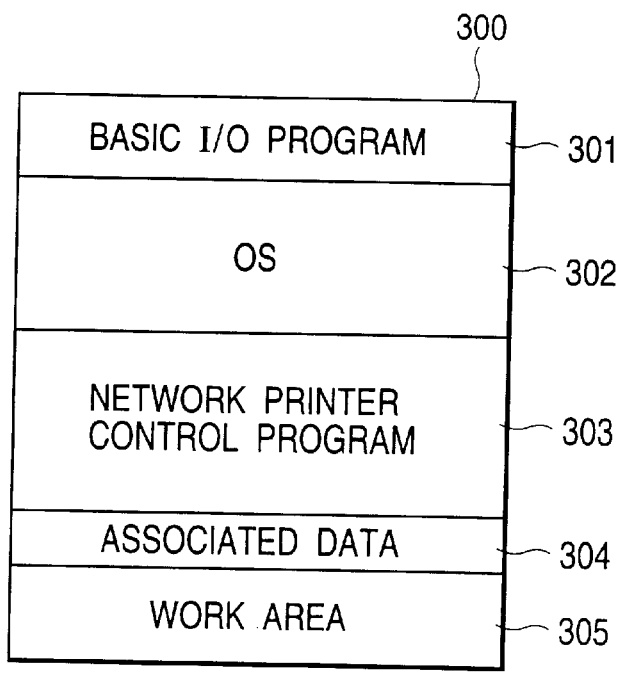
FIG. 3 is a memory map when a program is stored from an FD shown in FIG. 4 into an RAM in FIG. 2.

FIG. 3 shows a memory map 300 of a state in which the network printer control program has been loaded into the RAM 202 and can be executed.

In the embodiment, an example in which the network printer control program and the associated data are directly loaded from the FD 204 into the RAM 202 and are executed is shown. However, as another example, each time the network printer control program is made operative from the FD 204, it can be also loaded from the HD 205 into the RAM 202. A medium to record the network printer control program is not limited to the FD but any one of a CD-ROM, an IC memory card, and the like can be also used. Further, it is also possible to record the network printer control program into the ROM 201, to construct it so as to form a part of the memory map, and to directly execute it by the CPU 200.

Reference numeral 301 denotes a basic I/O program. A program having an IPL (initial program loading) function to read out the OS from the HD 205 into the RAM 202 when a power supply of the control apparatus is turned on and to start the operation of the OS or the like has been stored in the region of the basic I/O program 301. Reference numeral 302 denotes a region to store the OS. The network printer control program is stored in a region 303 and the associated data is stored in a region 304. A region 305 is used as a work area for the CPU 200 to execute the network printer control program.

Figure 6:
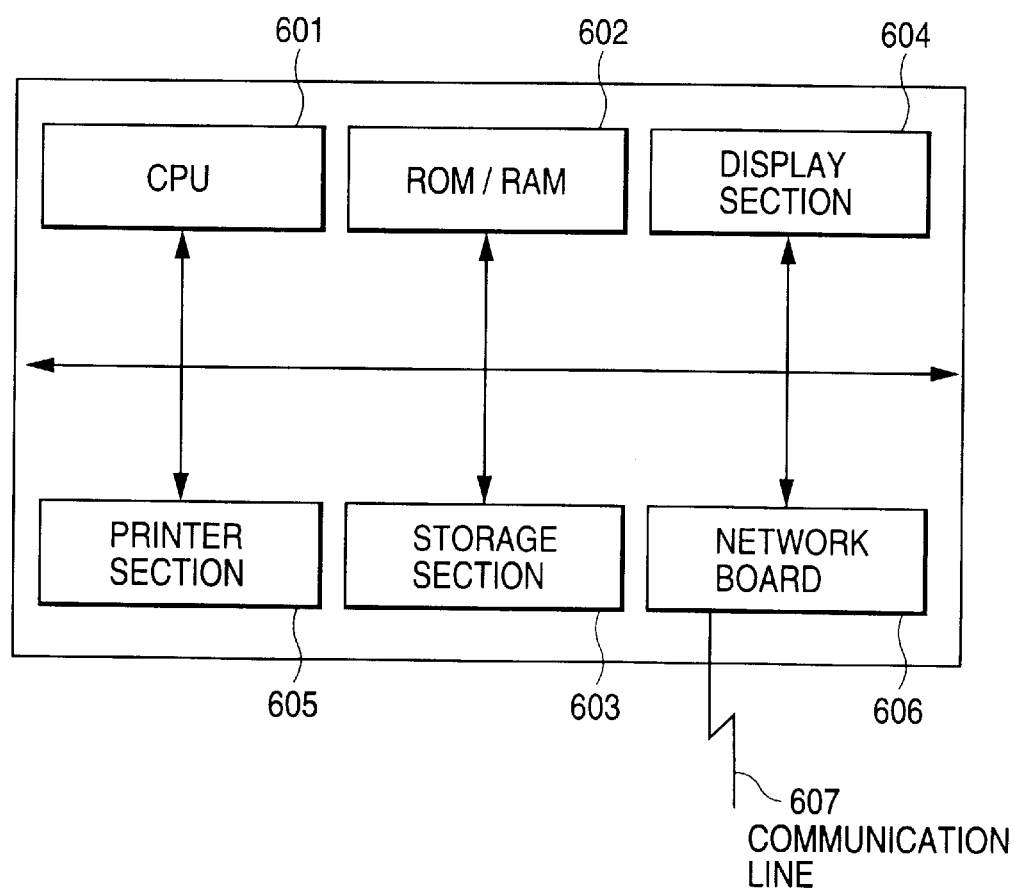
FIG. 6 is a block diagram showing a schematic construction of a network printer in FIG. 1.

FIG. 6 is a block diagram showing a schematic construction of the network printer 105 in the embodiment. In the embodiment, although a laser beam printer (LBP) is used as a network printer, it is not limited to the LBP and a printer of other system can be also obviously used.

Reference numeral 601 denotes a CPU to control the whole apparatus; 602 an ROM/RAM including a buffer for temporarily storing a control program to control the CPU 601, constant data, and transmission/reception data; and 603 a storage section such as a hard disk for storing data to be transmitted and received, the control program to be executed by the CPU 601, and data.

Reference numeral 604 denotes a display section for displaying the data stored temporarily in the ROM/RAM 602, the contents of the data stored in the storage section 603, an operating situation, or the like.

Reference numeral 605 denotes a printing section for printing and outputting bit map data formed by the CPU 601 on the basis of a program stored in the ROM/RAM 602.

Reference numeral 606 denotes a network board. Data information such as print data, job information, or the like is communicated with an external apparatus such as client computer, server, or the like through the network board. Reference numeral 607 denotes a communication line for connecting a network to the network board 606.

Figure 7:
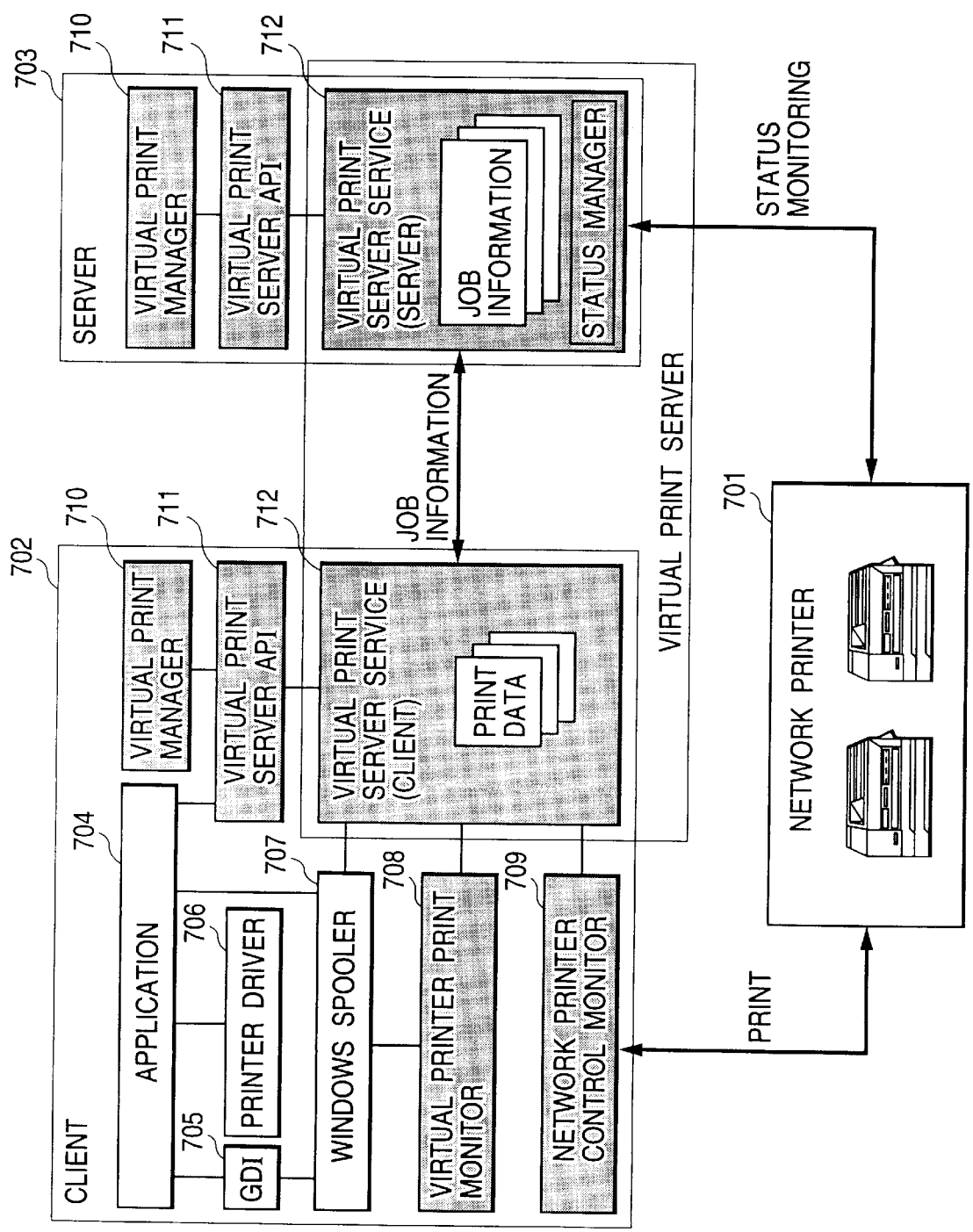
FIG. 7 is a diagram showing soft module constructions of a client computer and a server according to the embodiment.

FIG. 7 is a diagram showing soft module constructions of the client computer and server of the invention. They are supplied from, for example, the FD.

Reference numeral 701 denotes a network printer; 702 a soft module construction of the client computer; 703 a soft module construction of the server; 704 an application module for issuing a printing instruction to the network print system of the invention; 705 a GDI of Windows (registered trademark); 706 a printer driver which is assembled in Windows; 707 a printer spooler in Windows; 708 a printer monitor for a virtual printer; 709 a control monitor for a network printer; 710 a virtual print manager; 711 a virtual print server API (Application interface); and 712 a virtual print server service. Those modules construct a system of a virtual print server according to the invention and are supplied from a storage medium, namely, the FD 204 in the embodiment.

The virtual print manager 710, virtual print server API 711, and virtual print server service 712 exist in both of the client computer and the server. A combination of the virtual print server service (client) and the virtual print server service (server) constructing the virtual print server service 712 is hereinafter called a virtual print server and this system is called a virtual print server system.

The operation for printing from the client PC 102 to the network printer 105 in the above construction will now be described. In the embodiment, it will be explained with respect to Windows as an example.

Figure 8:
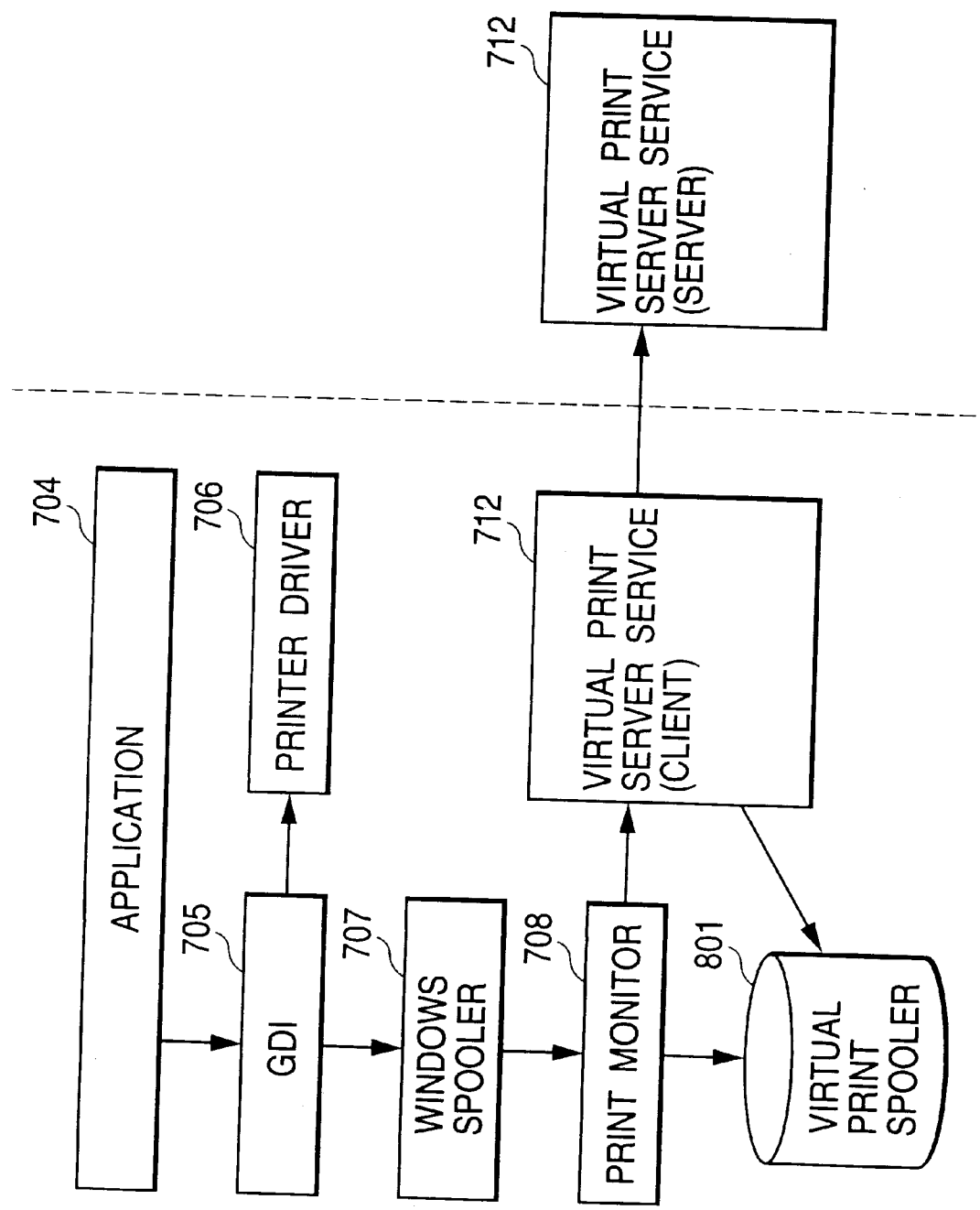
FIG. 8 is a diagram showing a flow of printing process when printing request is issued from the client to the server in FIG. 1.
Figure 9:
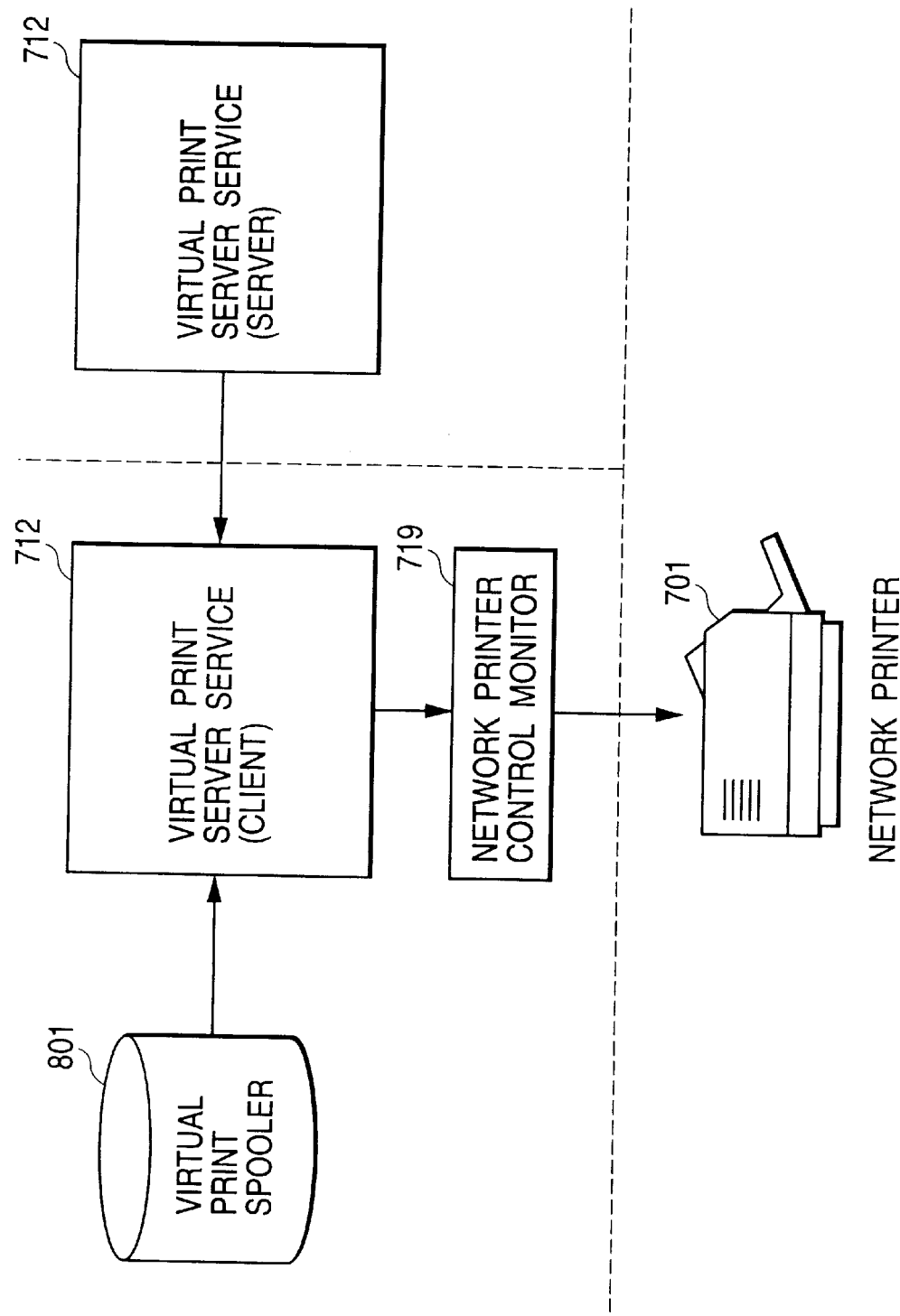
FIG. 9 is a diagram showing a flow of a printing process when print data is transmitted to a printer after an instruction indicating that the printing can be performed is sent from the server to the client in FIG. 1.

FIG. 8 shows a flow of a printing process for issuing the print request from the client PC to the server. FIG. 9 shows a flow of a printing process for supplying transmission possible information to indicate a permission of a printable mode from the server to the client PC and for transmitting print data from the client PC to the printer.

As for the block diagrams described already, explanation is continued by using the same reference numerals. The flow of the printing process will be described with reference to FIGS. 8 and 9.

On the client PC 702 (102), the application 704 starts to print through the GDI 705. The GDI notifies the Windows spooler 707 and print monitor 708 for virtual print server of the start of the printing. The print monitor 708 for virtual print server which received the print start instruction requests the virtual print server service (server) 712 existing on the server 703 (101) so as to start the preservation of the print data from now on via the virtual print server service (client) 712.

The GDI 705 request the printer driver 706 so as to convert the print data to a printer language. The print data converted to the printer language is spooled to the Windows spooler 707. The print monitor 708 for virtual print server receives the print data spooled in the Windows spooler 707 from the Windows spooler 707 and transmits the print data to the virtual print server service (client) 712.

The virtual print server service (client) 712 temporarily preserves the received print data into a temporary file (not shown) in a virtual print spooler 801 in the HD 205 in FIG. 2. When all of the print data is stored in the temporary file in the virtual print spooler 801 in the HD 205, the virtual print server service (client) 712 notifies the virtual print server service (server) 712 on the server 703 (101) of the end of preservation of the print data and requests it to print.

It is now assumed that the virtual print server service 712 uses the same module for both of the client PC and the server and can be separately used for the client and for the server by setting a function.

FIG. 9 is a diagram showing the operation until the print job which was registered first in the virtual print server service 712 is set to the order for printing via a management of the printing order of the server and the print data is actually transmitted to the network printer. The printing order in the server is controlled by the CPU serving as order control means in the server and is an order having a high priority included in the job information and a permission of the printable mode is transmitted through the interface as transmitting means from the print request whose reception time is early.

The virtual print server service (server) 712 issues transmission possible information as an instruction showing the printable mode to the client PC whose turn came to the printing order. The virtual print server service (client) 712 which received the instruction reads out the print data temporarily preserved in the virtual print spooler 801 of the HD 205 and supplies it to the control monitor 709 for network printer.

The control monitor 709 for network printer transmits the print data to the network printer 701 through a print communication protocol. The print data is printed by the network printer 701.

Figure 10:
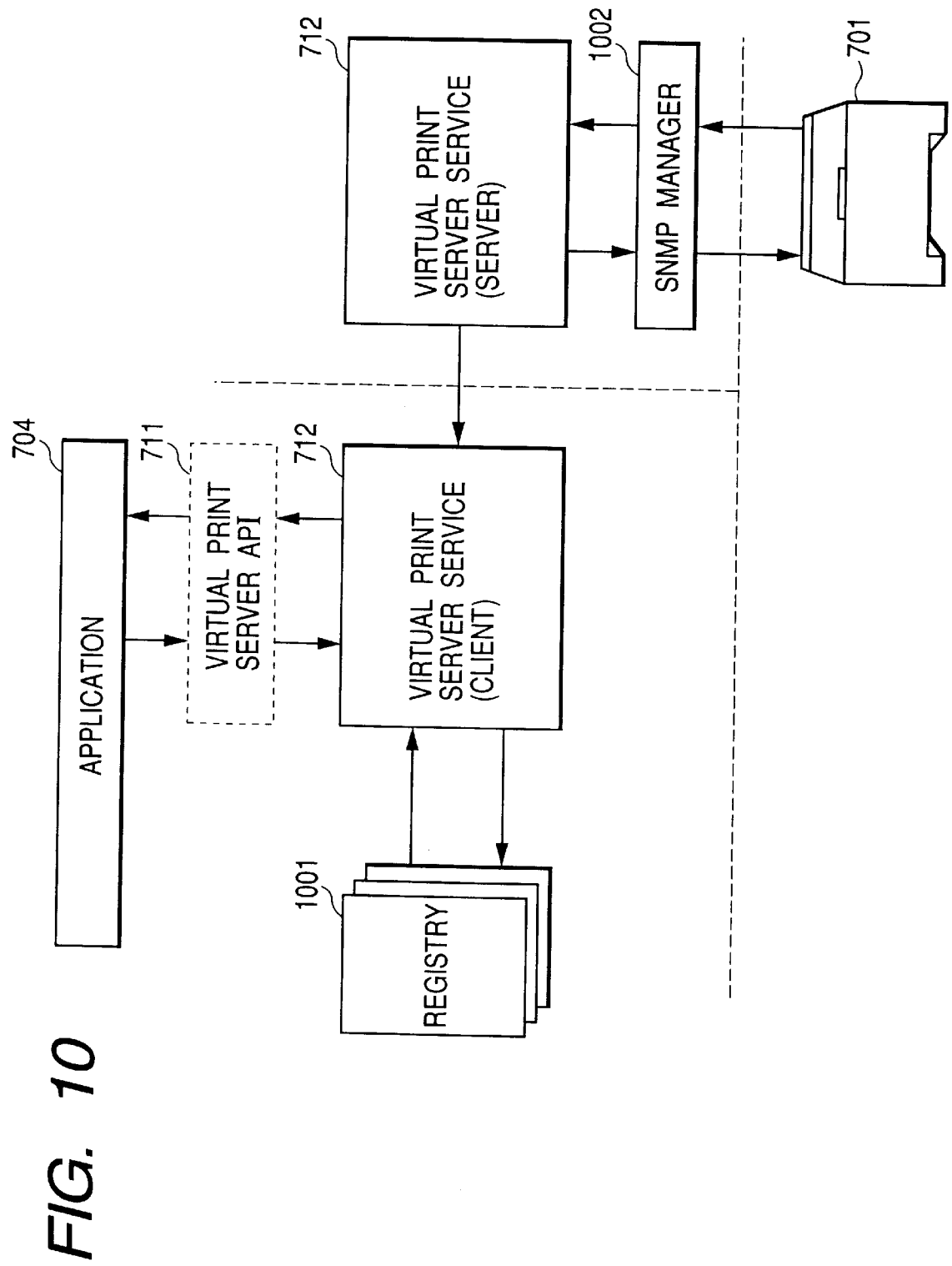
FIG. 10 is a diagram showing a flow of a printer status in the virtual server system according to the embodiment.

The operation to notify the client PC of the status of the network printer 701 will now be described with respect to Windows as an example. FIG. 10 shows a flow of the printer status.

In the embodiment, the virtual print server service (server) 712 requests an SNMP manager 1002 as status detecting means of the printer of the invention so as to collect the statuses of the network printer 701 at an interval (default) of five seconds. The SNMP manager 1002 issues a status collecting request to the network printer 701. The network printer 701 returns the present printer status. When the status of the network printer 701 changes, the virtual print server service (server) 712 notifies the client PC using the network printer 701 of the status change.

The virtual print server service (client) 712 in the client PC receives the change notification of the printer status issued from the server and preserves the printer status into a registry 1001 in the RAM in the client PC. The application 704 can get the printer status preserved in the registry 1001 via the virtual printer server API 711.

The virtual print server system manages the status of the printer and executes a printing process in this manner.

The embodiment relates to a case using WindowsNT, in which the print monitor 708, virtual print spooler 801, virtual print server service (client/server) 712, and network printer control monitor 709 are newly formed in the invention and the others are modules based on the WindowsNT standard. The invention, however, is not limited to them and can be also constructed by another OS such as OS/2 or the like.

The virtual print server service will now be described. The virtual print server service 712 is the nucleus of the virtual print system and the same module is separately used for the client and the server by the setting.

The virtual print server service 712 to be set as a server is not limited to only the server but by setting it as a client, the virtual print server service can be also operated as a client. When the server is set, a name is allocated to the network printer and its IP address is designated, thereby enabling the printer to be used from the client. As other items, items such as using protocol, response time for the client, status monitoring interval of the printer, and the like are set from the input means.

As a setting of the client, the server is designated, the network printer which is managed by the server is set, and printer information is obtained. In the client designated as a reserve server from the server or the client which is used as a reserve server by the user, in addition to the setting of the client PC, the server is also set. The set contents are the same as the contents set for the server. In the reserve server, however, the function as a server is not soon validated but is activated when a fault occurs in the server as will be explained hereinlater.

The virtual print server service on the client in which the reserve server has been set periodically communicates with the server, obtains the scheduled job information which the server has, and stores a list of printing orders formed on the basis of the job information into the storing means. With this method, the reserve server always has the same job information as that possessed by the server. Even when a fault occurs in the server, a restoration can be easily performed as will be explained hereinlater. The user does not need to individually again register the job information which has been registered so far.

Between the server and the client, a synchronization is periodically accomplished in order to allow the virtual print server service (client) as detecting means for detecting the status of the server of the invention to promptly detect a fault of the server. The synchronization is accomplished between the virtual print server service (server) and the virtual print server service (client).

The client periodically accesses to the server at the interval designated by the "server accessing interval". When there is no response, it is determined that a fault occurred in the server. A preset time-out value is used for the discrimination about the fault. When a fault occurs in the server, the ordinary client enters a stand-by mode for waiting for a restoration of the server.

When the client designated as a reserve server detects the fault of the server by a similar method, the client validates the server function of the virtual server module existing on the client. As for the setting of the server, since it is the same as that of the original virtual print server, a virtual server system in which this client is used as a virtual server functions. Even if the server function is validated, the function of the client is held valid. When the other clients find out the virtual print server by the reserve server on the network, a network print system in which the found virtual print server is used as a server is started. When finding the reserve server, the client on the network can always search the reserve server whose function is started as a virtual server. However, a load of the network is reduced by using a method whereby the information processing apparatus functioning as a reserve server notifies all of the clients on the network.

Figure 12:
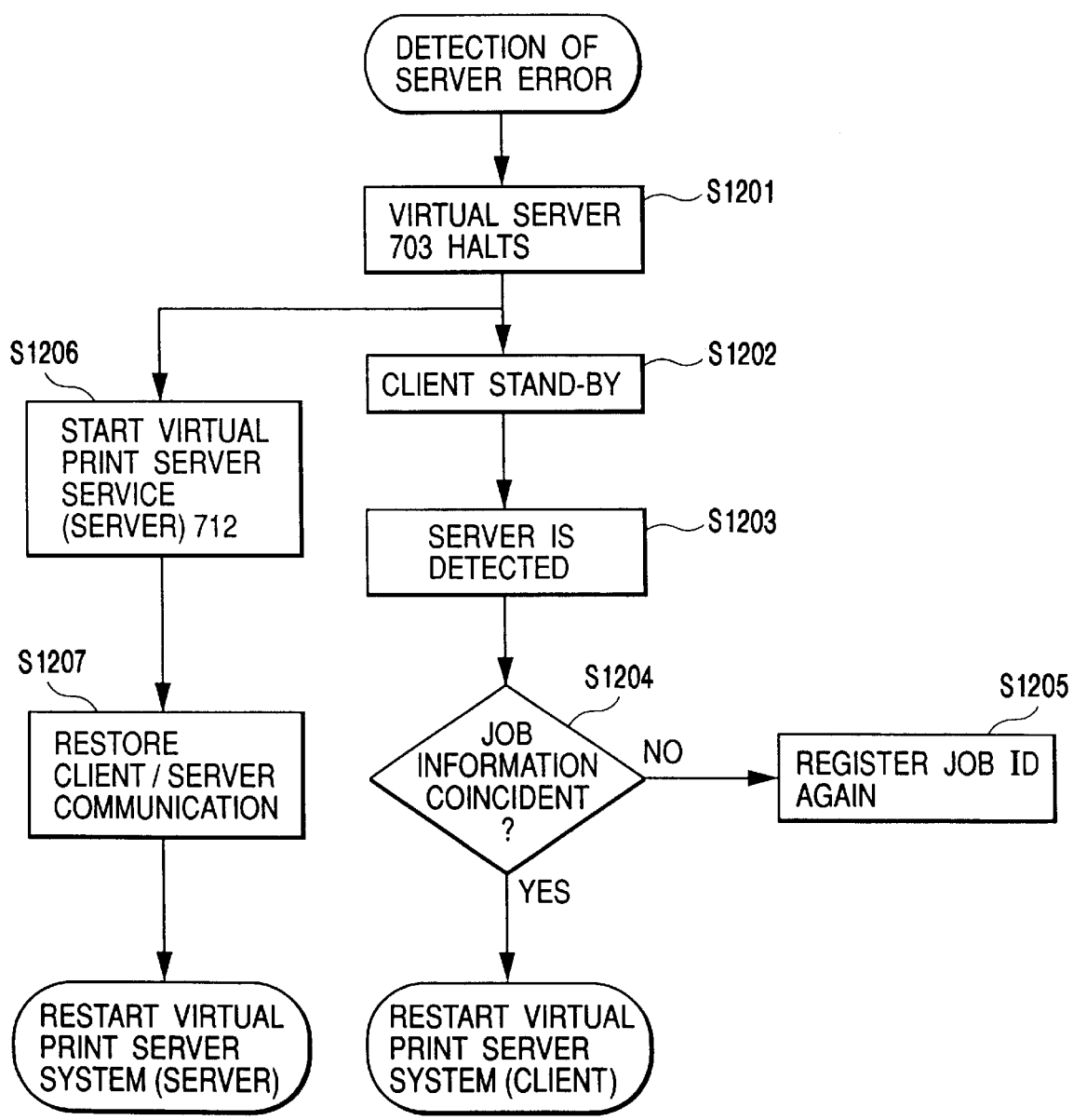
FIG. 12 is a flowchart showing the operation of a client in case of performing a restoring operation between the client and a server when the server is newly detected.
Figure 13:
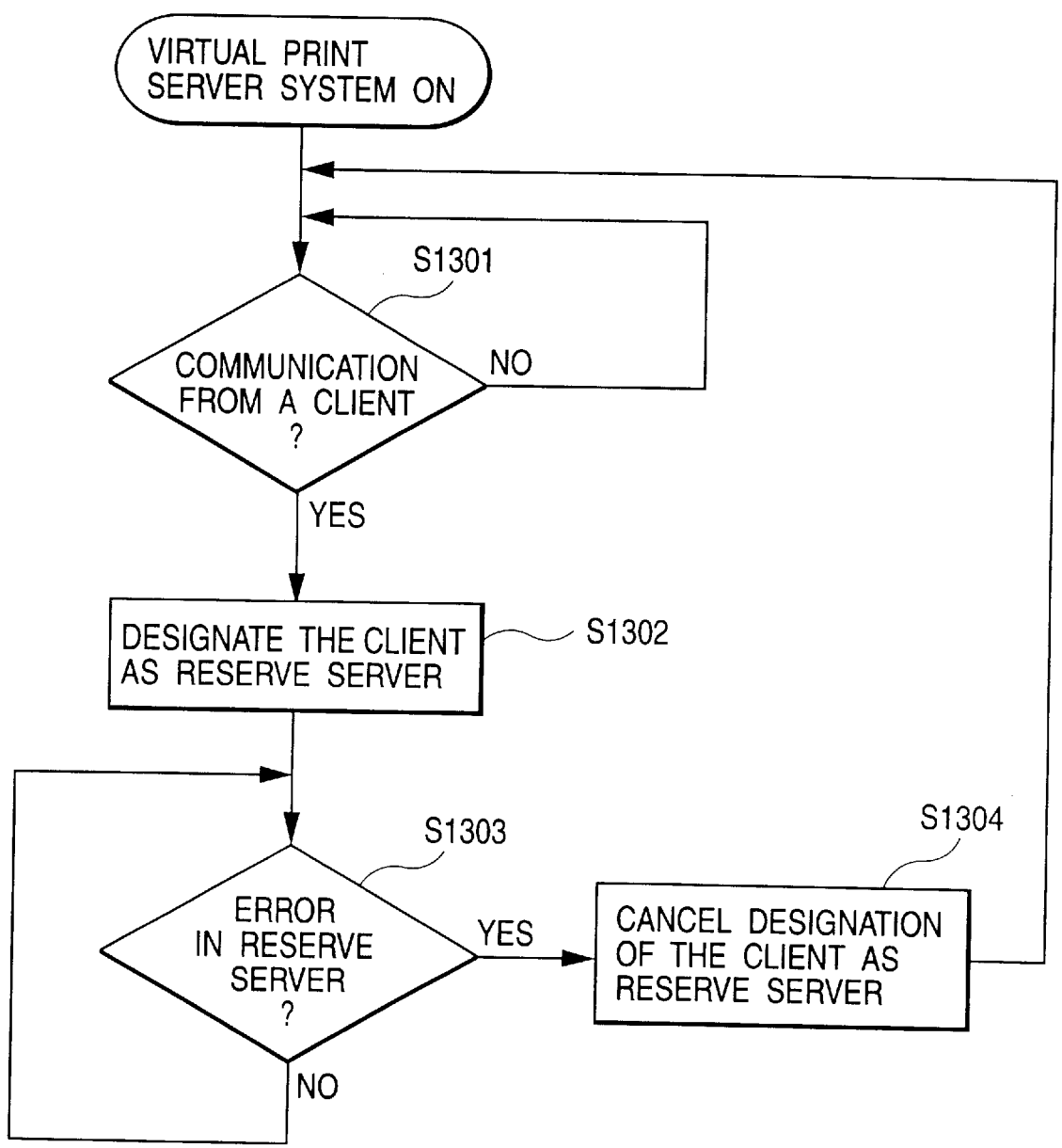
FIG. 13 is a flowchart showing the operation of a server when any one of clients is designated as a reserve server.

The operation about the above reserve server activation is shown in a flowchart of FIG. 12. A flow when the client designated as a reserve server starts the virtual print server service (server) 712 is shown on the left side of the flowchart.

A restoring operation between the client and the server on the server side is realized by matching the job information with the client as will be explained hereinlater. This operation is also executed between the reserve server and the virtual print server service (client) 712 of the client and is shown on the right side of the flowchart. The operation of the client will be explained later.

In step S1201, the server 703 (virtual server) halts due to some circumstances. When it is determined by the foregoing detecting means that the server 703 halted, the client designated as a reserve server starts the virtual print server service (server) 712 installed in the client in step S1206. In step S1207, the restoring operation between the client and the server is executed. When the restoring operation is finished, the virtual server system is restarted.

The client operation for this period of time is as follows. In step S1201, when the server 703 (virtual print server) halts due to some circumstances, in step S1202, the client enters a stand-by mode while continuing the detection until the client set as a reserve server becomes a formal server and is detected. In step S1203, when the client detects the server (server newly set) on the network system, in step S1204, each client confirms the job information registered in the server 703 (original server) to the server (newly set). If they do not coincide as a result of the confirmation of the job information, the job information (job ID) is again registered into the server in step S1205. When the job information of all of the clients coincide in step S1204, the virtual server system is restarted and the processing routine is returned to the ordinary process.

As described above, since the reserve server plays the role of the virtual server, the processes of the network print system are continued.

Figure 11:
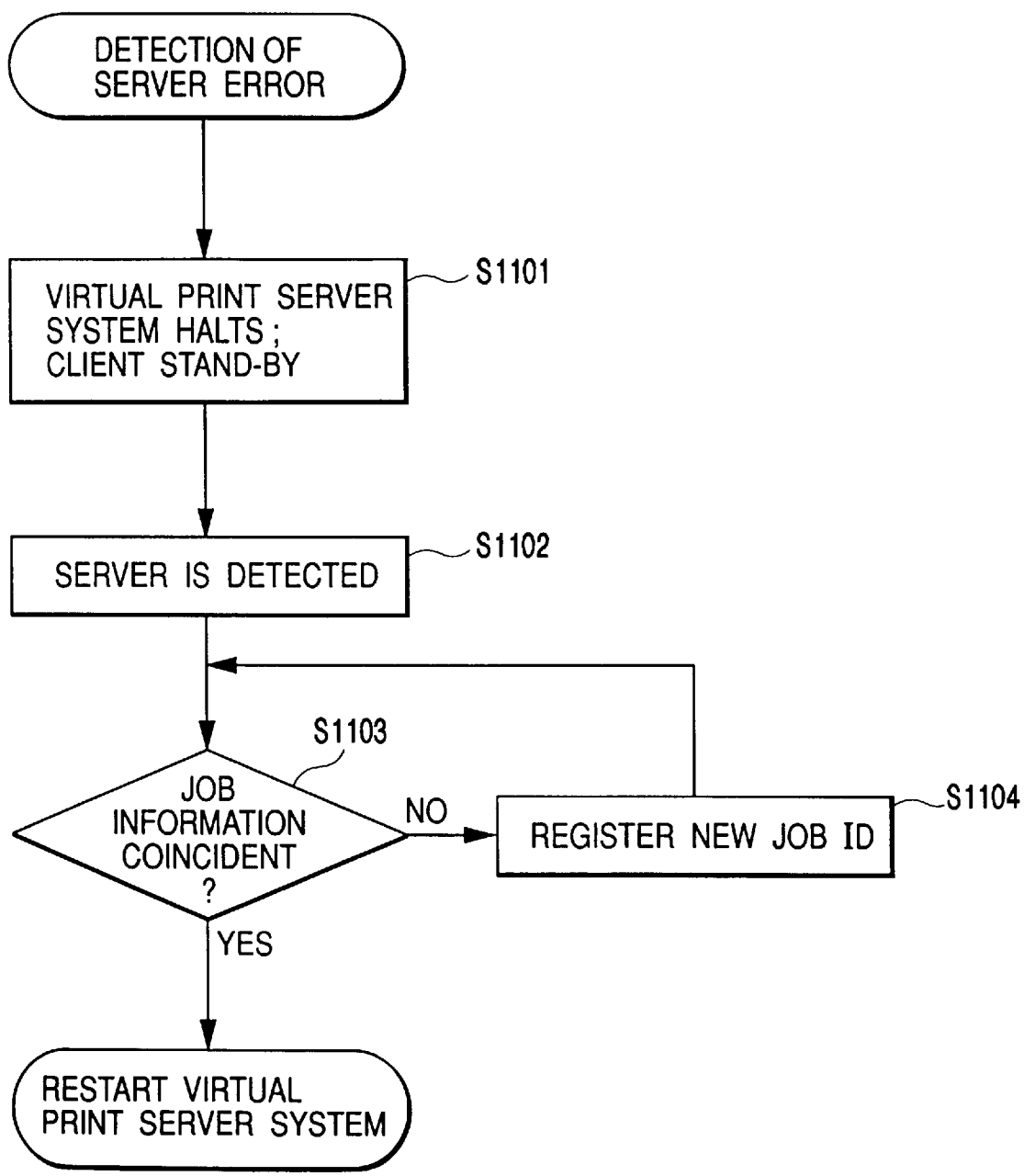
FIG. 11 is a flowchart showing the operation of a client in case of confirming job information when a server is newly detected.

The operation of the client in case of confirming the job information when the server is newly detected is shown in a flowchart of FIG. 11. As mentioned above, this operation is also executed in the virtual print server service (client) 712 of the reserve server. This operation is shown on the right side of FIG. 12. The reregistration of the job between the client and the server mentioned above corresponds to the restoring operation between the client and the server in the virtual print server service (server) 712 in FIG. 12.

In step S1101, it is now assumed that a fault occurs in the server 703 in a state where the jobs were scheduled in the virtual server. The client set as a reserve server consequently becomes the reserve server. The reserve server has the jobs which have been scheduled before by the previous server 703. Therefore, the client can use the scheduled print job as it is. However, a time difference certainly occurs until the client set as a reserve server formally becomes the server and is started after a fault occurred in the server 703. There is, consequently, a possibility of occurrence of a difference between the job information recognized with respect to the job information which have actually registered from the other client and the job information registered in the reserve server.

Therefore, in step S1102, when the client set as a reserve server formally starts as a server and is detected as each client, each client confirms the job to the server which was newly set in step S1103. This operation is executed when the fault once occurs in the server 703 and the reserve server is started or when the server 703 in which the fault occurs is again validated.

When the job possessed by each client itself and the job information which has been scheduled in the server coincide, the print job is used as it is. When they do not coincide, in step S1104, the job is again registered into the server 703 or the reserve server which became the formal server. That is, the virtual print server service (client) 712 abandons the job ID possessed for the previous virtual print server service (server) 712, newly adds the job to the new virtual print server service (server) 712, and obtains a new job ID.

The job information is information of the print data as data to be printed and includes a document name of the print data, an owner, the number of pages, a sheet size, a data size, priority information, and the like. On the basis of the job information, the virtual server manages the printing order. Since the actual print data is not included in the job information, the print data is transmitted from the client computer to the printer in the printing mode.

According to the invention as mentioned above, the client has the transmitting means (interface 209) for transmitting the job information of the print data to the server and the spool means (virtual print spooler of the HD 205) for spooling the print data; the server has the order control means (CPU 200 and order control list of the RAM 202) for controlling the printing order on the basis of the job information received from the client and the transmitting means (interface 209) for transmitting the transmission possible information indicating that the print data can be transmitted to the printer; and when a fault occurs in the server, the client becomes the reserve server and plays the role of the server, so that the printing process on the network can be continued.

The client set as a reserve server always stores the same printing order information (order control list) as that of the server, so that even if a fault occurs in the server and the client functions as a reserve server, the printing operation can be restarted while holding the printing order so far.

When a fault occurs in the server and the client set as a reserve server functions as a reserve server, by receiving the job information from the client and reconstructing an order control list, the job is automatically registered when it is seen from the user for the job requested by the client after the occurrence of the fault in the server, so that the printing operation can be normally restarted without any consciousness of the user.

(Second Embodiment)

Second embodiment of the invention will now be described.

The ordinary operation of the virtual server system is the same as that of the first embodiment. The second embodiment will now be described on the assumption that a constructional diagram is also the same as FIG. 1.

In the embodiment, the reserve server is set to all of the clients 102 to 104 for the first time as described in the first embodiment. The server 101 gives a right such that the client becomes the reserve server for the first time to the client (one of the clients 102 to 104) which communicated with the server 101 by turning on the power supply for the first time. After that, until the reserve server loses the right of the reserve server, even if the other client communicates with the server 101, the right of the reserve server is not given. The operation in the server 101 (703 hereinafter) is shown in a flowchart of FIG. 13.

In step S1301, the server 703 is in the stand-by mode for waiting for the execution of the communication from the client. For example, if there is a communication from the client 102, in step S1302, the virtual print server service (server) 712 (means to which the right was given) designates the client 102 as a reserve server. The client 102 designated as a reserve server functions as a reserve server after that.

In step S1303, whether a fault has occurred in the client 102 designated as a reserve server or not is discriminated by the detecting means (virtual print server service 712) described in the first embodiment. If a fault such that the client 102 designated as a reserve server turns off the power supply or the like occurs and the client 102 cannot function as a reserve server, in step S1304, the server 703 deprives the right of the reserve server from the client 102 set as a reserve server by the virtual print server service (server) 712 (right depriving means), returns to the process in step S1301, and waits for the communication from the next client.

In step S1301, when there is no communication from the client, the server 703 enters a stand-by mode until a communication of the printing process reaches from the client.

In step S1303, when it is determined that no fault occurs in the reserve server (client 102 here), the ordinary process of the server is executed until a fault occurs in the reserve server 102. Since the server 703 (101) accesses to the client at a "client accessing interval" as mentioned above, the fault can be detected.

In step S1301, the virtual print server service (server) 712 of the virtual server 703 waits for the communication from the client and, in step S1301, this client is designated as a reserve server. However, the invention is not limited to this construction. The right of the reserve server can be also given to the client which accessed to the server 703 at the "server accessing interval" for the first time or the client whose power supply was turned on for the second time is stored and the right can be also given thereto. In the embodiment, although the right as a reserve server has been given from the server to the client, the user who uses the network can also set and register a certain client as a reserve server from the input means 206.

In step S1303, resignation of the right of the reserve server can be also notified to the server 703 when the reserve server turns off the power supply. Further, the server can also commonly use the process for detecting a fault at a predetermined interval existing in each client.

Figure 14:
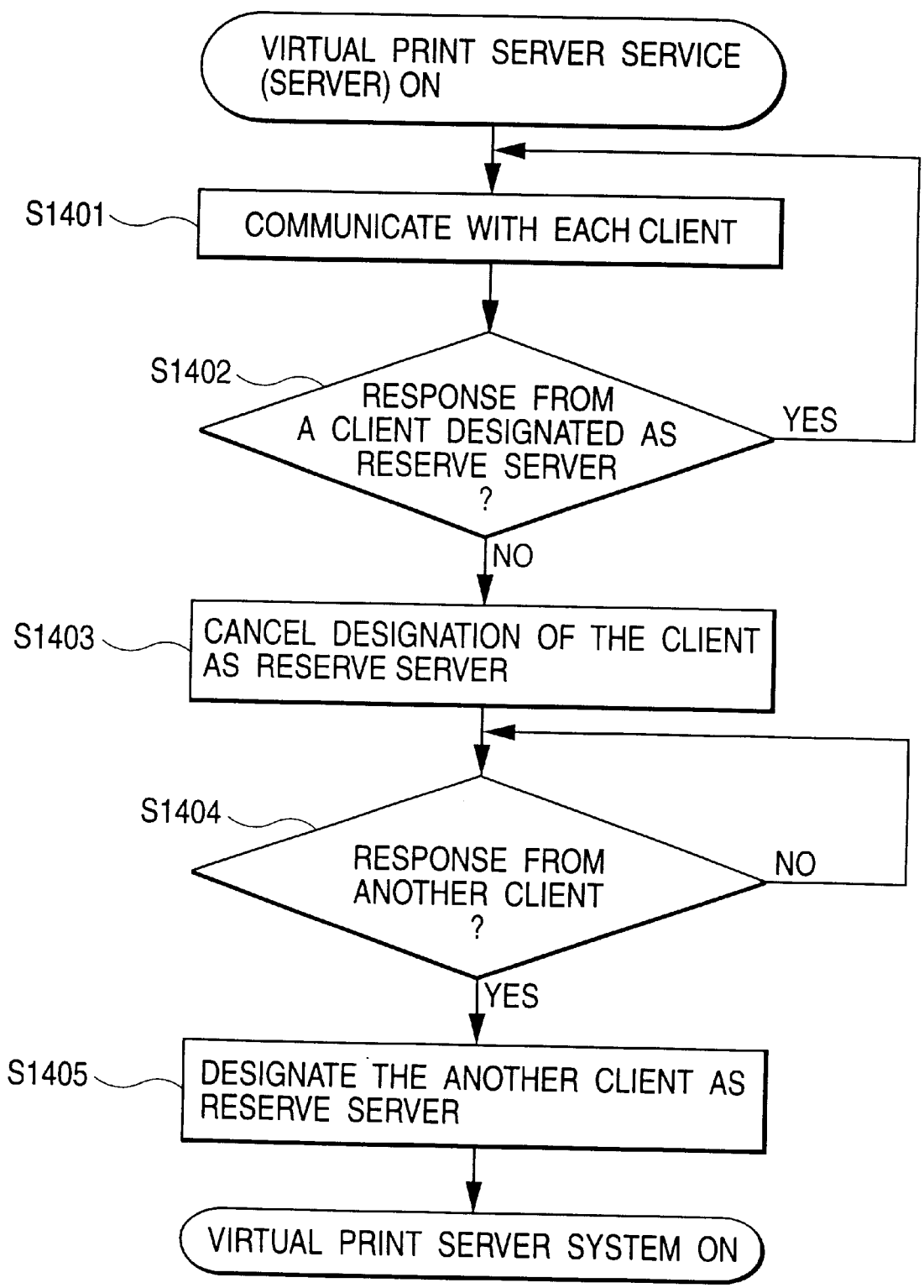
FIG. 14 is a flowchart showing the operation of a server in case of designating another client as a reserve server when there is no response from a reserve server.
Figure 15:
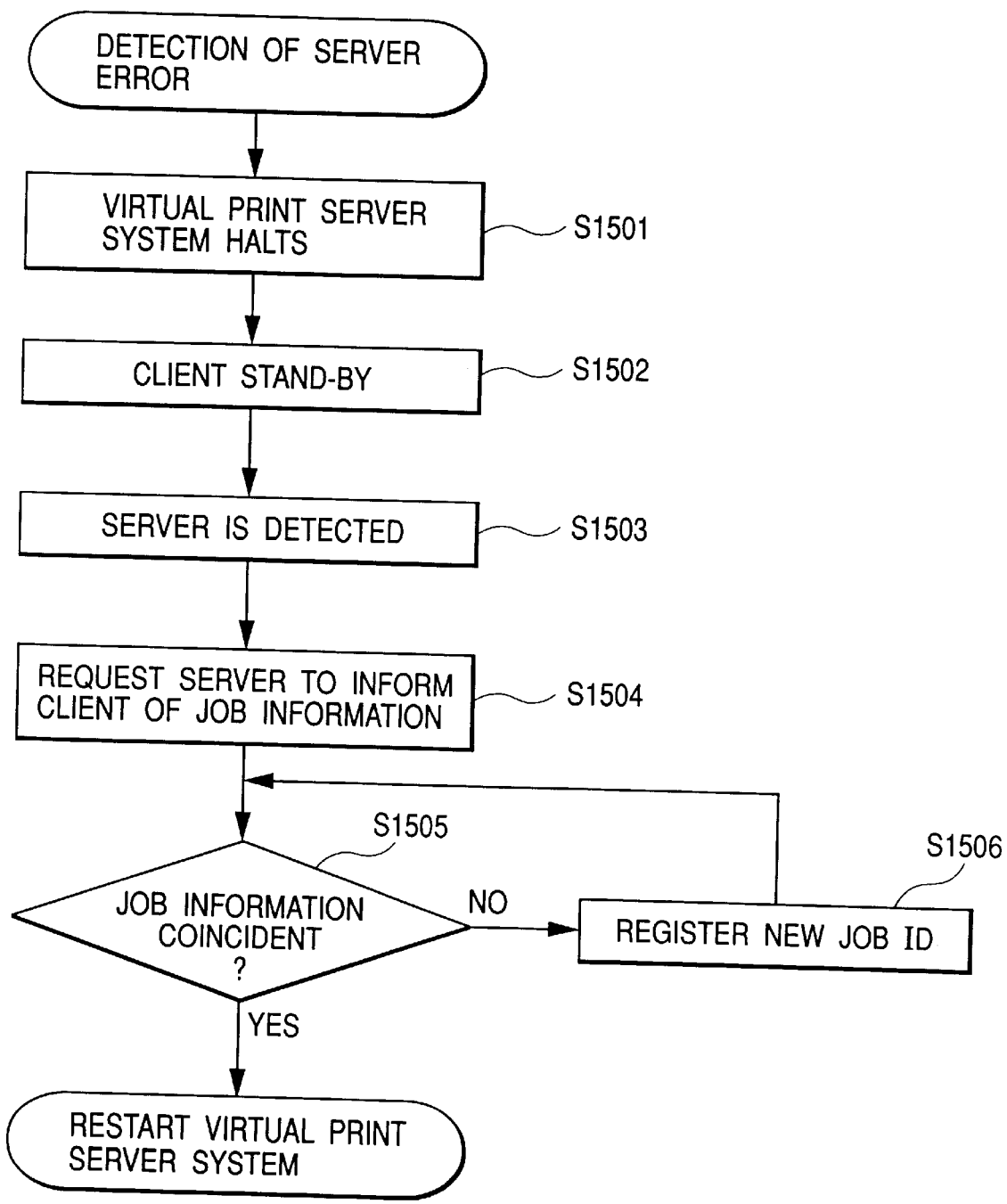
FIG. 15 is a flowchart showing the operation of a client in case of confirming job information when a server halts and a server is detected on a network.
Figure 16:
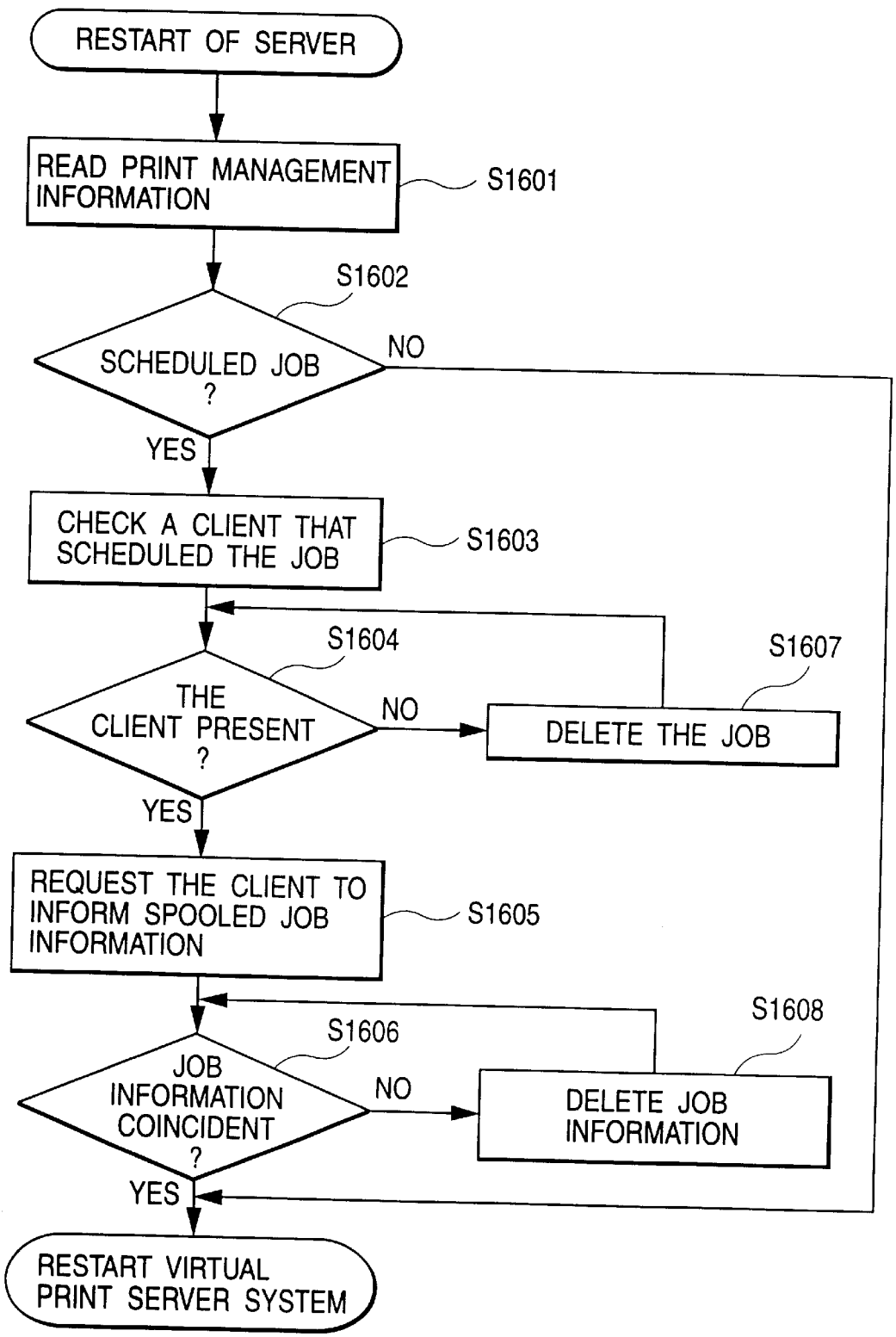
FIG. 16 is a flowchart showing the operation of a server after the restart.

The operation is shown in a flowchart of FIG. 14.

In step S1401, the server 703 communicates with the client at the "client accessing interval". This communication is also similarly executed to the client (for example, 102) set as a reserve server by the user setting or from the server. In step S1402, the presence or absence of a response from the client 102 designated as a reserve server is discriminated. If there is a response from the client 102 designated as a reserve server, it is determined that there is no fault in the reserve server. The processing routine is returned to step S1401 and the communication to the client is again performed at a preset time interval.

If there is no response from the client 102 designated as a reserve server, the server 703 decides that there is a fault in the reserve server. In step S1403, the designation of the reserve server of the client 102 is cancelled by the right depriving means (virtual print server service 712). In step S1404, the server 703 subsequently waits for a communication from another client. In step S1405, the client (for example, 103) which first communicated is designated as a reserve server by the right giving means (virtual print server service 712) and notifies to the client.

Consequently, the reserve server always exists in the virtual server system. When the notification to turn off the power supply is received from the client designated as a reserve server, the processing routine advances to a step of cancelling the reserve server in the flow. The subsequent processes are executed in a manner similar to those when a fault occurs in the client of the reserve server.

In the second embodiment as mentioned above, in addition to the construction in the first embodiment, the client computer has the right giving means (virtual print server service (server) 712) for giving the right as a reserve server, thereby allowing the reserve server to exist in the virtual print server system (present network print system). Even if a fault occurs in the reserve server, the server 703 detects it and an alternating reserve server is installed, so that the reserve server can be allowed to always exist in the virtual server system.

(Third Embodiment)

Third embodiment of the invention will now be described.

As described in the second embodiment, it is assumed that the synchronization is periodically accomplished between the server and the client in order to promptly detect the fault. This process is executed between the virtual print server service (server) 712 and virtual print server service (client) 712. The client periodically accesses to the server 703 at the interval designated as a "server accessing interval". When there is no response, it is decided that the fault occurred in the server 703. A preset time-out value is used in the discrimination about the occurrence of a fault. When a fault occurs in the server 703, the client enters a stand-by mode for waiting for the restoration of the server 703.

The server 703 is restarted after the removal of the fault. In this instance, the client has the print job which has been scheduled before in the server 703. This job information does not exist in the server. After the server 703 was restarted, each client knows that the server 703 was restarted by making a response to the access at the server accessing interval for the server 703. After the server was detected, each client starts the restoring operation. This restoring operation is shown in a flowchart of FIG. 15. Each client requests the server 703 so as to notify the server 703 of the job information scheduled by itself for the server 703.

In step S1501, the client determines that the virtual server 703 halted due to some fault. In step S1502, a detection of a server (server 703 or a server newly established) is performed. In step S1503, since the fault in the server 703 was eliminated, when it is assumed that the server 703 was restarted, each client can detect the server 703 by a response to the access at the server accessing interval for the server 703. Each client requests the notification of the information of the server 703 in step S1504 and confirms the job information preserved in the server 703 in step S1505. If the job information which has already been registered by the client does not exist on the server 703, step S1506 follows. Each client again schedules the remaining jobs obtained by excluding the jobs scheduled in the server 703 from the jobs which were spooled in the own client (all jobs here) into the server 703 and also changes the job information of the virtual print server service (client) 712. As mentioned above, the print job spooled on the client is again scheduled onto the server 703. In step S1505, when the scheduling of all of the jobs of each client is finished, the virtual server system again operates.

As described above, even after the server was restarted from the state where a fault occurs in the virtual server and the client waits for the restart of the server, the print job spooled to the client is automatically again scheduled to the server, so that the printing operation can be performed as it is.

The network print is continued even when a fault occurs in the server as mentioned above.

(Fourth Embodiment)

Fourth embodiment of the invention will now be described.

The server 703 periodically records the scheduled print management information to a recording medium such as a hard disk or the like. A recording location is a predetermined location and is always overwritten by new information. When a fault occurs in the server 703 and the server is restarted after the elimination of the fault, the server 703 first reads the print management information stored in the storage medium. The operation of the server 703 after the restart will now be described with reference to a flowchart of FIG. 16.

In step S1601, when the server 703 restarts, it always reads the print management information from the recording medium such as a hard disk or the like. In step S1602, a check is made to see if the scheduled print job information exists in the storage medium. If there is no print job information in the storage medium, it is determined that the server is normally started, so that the ordinary operation of the virtual server is performed. When there is the scheduled print job information in the storage medium, it is determined that the previous shut-down is not normally finished, and the processing routine advances to step S1603 in order to start the restoring operation of the virtual server. In step S1603, the server 703 confirms the existence of the client in the schedule information. In step S1604, if the absence of the client can be confirmed, step S1607 follows and the job of the relevant client is deleted. In step S1604, if the existence of the client in the schedule information is confirmed, the processing routine advances to step S1605. The notification of the spooled job information is requested to the client. For example, the client notifies the server of the job ID of the spooled print job. In step S1606, the server 703 checks to see if the job information notified from each client and the job information stored in the storage medium of the server 703 coincide. If the server 703 detects that any information which is not included in the job information notified from each client exists in the job information scheduled for each client, step S1608 follows and the dissident job information in the storage medium is deleted. There is a case where the client deletes the spooled job for a period of time during which the server 703 is restarted. In such a case, since the job information does not coincide with the information of the server, it has to be deleted also from the server 703. There is also a case where the client spools a new job for a period of time during which the server 703 is restarted. However, since the virtual print server service (client) 712 cannot obtain the job ID from the server 703, such a job is not notified to the server 703. This job is scheduled after the virtual server system operated. When the job information which does not exist on the client is deleted on the server 703, the virtual server system starts the operation. As mentioned above, the client first obtains the job ID from the server 703 for the spooled job without getting the job ID from the server 703 and schedules it for the server 703. After completion of the scheduling of the print job which was merely spooled, the client side executes the ordinary operation of the virtual server system.

The above operation is not limited to the case where the server restarts but is also valid in the case where after the network line of the server temporarily became busy, it again operates. In this case, although the scheduled job remains on the server, the client can delete the spooled job for the busy period of the server or can newly spool. In this case as well, it is also possible to restore by the same operation.

In the fourth embodiment, consequently, by always storing the job information to the storage medium by the server, even if the server is restarted, by reproducing the job information, the server can be again operated without changing the order control of the print job from the previous order. Even with respect to the dissidence of the job information between the server and the client which occurs during the restart of the server, the coincidence can be obtained by the restoring operation.

As described above, according to the first aspect of the invention, in the virtual server system, when a fault occurs in the virtual print server, since the client set as a reserve server plays the role of the server, the virtual server system can be continuously operated.

According to the second aspect of the invention, the reserve server in the first aspect always obtains the print job information possessed by the virtual server (server), so that when the reserve server is started, the job information managed by the previous server can be used as it is, and even when a fault occurs in the server, the virtual server system can be smoothly operated.

According to the third aspect of the invention, the setting of the reserve server in the first aspect is performed to all of the clients and the server detects the client whose power supply was turned on for the first time and designates it as a reserve server, so that the reserve server can always exist in the virtual server system. Therefore, even if the order to turn on the power supplies of the clients is not managed, the reserve server can always exist on the virtual server system.

According to the fourth aspect of the invention, when a fault occurs in the client designated as a reserve server in the third aspect, the server detects it and designates another client as a reserve server, so that even if a fault occurs in the reserve server, an alternating reserve server can be installed. Thus, even if a fault occurs in the reserve server, the reserve server can always exist on the virtual server system.

According to the fifth embodiment of the invention, in the virtual server system, after a fault occurred in the virtual print server, even if the server is restarted, the print job spooled by the client is again scheduled to the server, so that the job spooled in the client can be again used without abandoning. The client can omit the operation to again generate the print data.

According to the sixth aspect of the invention, in the virtual server system, by always recording the print management information to the recording medium by the server, when a fault occurs in the server and the server is restarted, by reproducing the print management information, the schedule of the print job on the server can be again operated without changing it from the previous schedule. With respect to the dissidence of the job information between the server and the client which occurred during the restart of the server, the coincidence can be obtained by the restoring operation.

What is claimed is:

1. A network print system comprising:
   a server; and
   a client computer that includes a transmission unit adapted to transmit job information of print data to said server and a spool unit adapted to spool the print data, wherein
   said server includes an order control unit adapted to control a printing order based on the job information transmitted by the transmission unit, and a sending unit adapted to send transmission possible information indicating that the print data can be transmitted to a printer to said client computer, and
   when a fault occurs in said server, said client computer plays a role of said server.

2. A system according to claim 1, wherein said client computer, which plays the role of said server, has been preset as a reserve server.

3. A system according to claim 2, wherein a same information as printing order information possessed by said server has always been stored in said client computer set as the reserve server.

4. A system according to claim 2, wherein the reserve server is automatically set based on an order of turn-on of a power supply in said client computer.

5. A system according to claim 2, wherein when the client computer set as the reserve server cannot operate, said client computer notifies said server of a message that it resigns a right as a reserve server, and said server newly sets another client computer as a reserve server.

6. A system according to claim 2, wherein:
   said server further includes a detection unit adapted to detect a fault of said client computer; and
   when it is detected by the detection unit that there is a fault in said client computer set as the reserve server, another client computer is newly set as a reserve server.

7. A network print system comprising:
   a server; and
   a client computer that includes a transmission unit adapted to transmit job information of print data to said server and a spool unit adapted to spool the print data, wherein
   said server includes an order control unit adapted to control a printing order based on the job information transmitted by the transmission unit and a sending unit adapted to send transmission possible information, and
   when a fault occurs in said server, said client computer enters a stand-by mode for waiting for a start of said server, the started server receives the job information from said client computer, and said server reconstructs the printing order based on the received job information.

8. A system according to claim 7, wherein said server further includes a recording unit adapted to always store the job information, and, when a fault occurs in said server, said client computer enters a stand-by mode for waiting for a start of said server, and the started server reconstructs a printing order based on the recorded job information.

9. A network printing method comprising:
- a transmitting step of transmitting job information of print data from a client computer to a server;
- a spooling step of spooling the print data to a spool unit of the client computer;
- an order control step of controlling a printing order based on the job information transmitted from the client computer to the server in said transmitting step; and
- a sending step of sending transmission possible information indicating that the print data can be transmitted to a printer from the server to the client computer,
- wherein when a fault occurs in the server, the client computer plays a role of the server.

10. A method according to claim 9, wherein the client computer, which plays the role of the server, has been preset as a reserve server.

11. A method according to claim 10, wherein a same information as printing order information possessed by the server has always been stored in the client computer set as the reserve server.

12. A method according to claim 10, wherein the reserve server is automatically set based on an order of turn-on of a power supply in the client computer.

13. A method according to claim 12, wherein, when the client computer set as the reserve server cannot operate, a control for newly setting another client computer as a reserve server is performed.

14. A method according to claim 13, further comprising a detecting step of detecting a fault of the client computer, and wherein, when it is detected in said detecting step that there is a fault in the client computer set as the reserve server, a control for newly setting another client computer as a reserve server is performed.

15. A network printing method comprising:
- a transmitting step of transmitting job information of print data from a client computer to a server;
- a spooling step of spooling the print data to a spool unit of the client computer;
- an order control step of controlling a printing order based on the job information transmitted from the client computer to the server in said transmitting step; and
- a sending step of sending transmission possible information indicating that the print data can be transmitted to a printer from the server to the client computer,
- wherein, when a fault occurs in the server, the client computer enters a stand-by mode for waiting for a start of the server, and the started server performs a control so as to receive the job information from the client computer and to reconstruct a printing order based on the received job information.

16. A method according to claim 15, wherein the server always stores the job information in a storage unit, and, when a fault occurs in the server, the client computer enters a stand-by mode for waiting for a start of the server, and the started server controls so as to reconstruct a printing order based on the job information stored in the storage unit.

17. A computer readable medium storing instructions for causing a computer to perform a method, the method comprising:
- a transmitting step of transmitting job information of print data from a client computer to a server;
- a spooling step of spooling the print data to a spool unit of the client computer;
- an order control step of controlling a printing order based on the job information transmitted from the client computer to the server in said transmitting step; and
- a sending step of sending transmission possible information, indicating that the print data can be transmitted to a printer from the server to the client computer and that can be read out and executed by a computer, has been stored,
- wherein, when a fault occurs in the server, a control so that the client computer plays a role of the server is performed.

18. A medium according to claim 17, wherein the client computer which plays the role of the server has been preset as a reserve server.

19. A medium according to claim 18, wherein a same information as printing order information possessed by the server has always been stored in the client computer set as the reserve server.

20. A medium according to claim 18, wherein a control to automatically set the reserve server based on an order of turn-on of a power supply in the client computer is performed.

21. A medium according to claim 18, wherein, when the client computer set as the reserve server cannot operate, a control for newly setting another client computer as a reserve server is performed.

22. A medium according to claim 21, wherein the method further comprises a detecting step of detecting a fault of the client computer, and wherein, when it is detected in said detecting step that there is a fault in the client computer set as the reserve server, a control for newly setting another client computer as a reserve server is performed.

23. A computer readable medium storing instructions for causing a computer to perform a method, the method comprising:
- a transmitting step of transmitting job information of print data from a client computer to a server;
- a spooling step of spooling the print data to a spool unit of the client computer;
- an order control step of controlling a printing order based on the job information transmitted from the client computer to the server in said transmitting step; and
- a sending step of sending transmission possible information, indicating that the print data can be transmitted to a printer from the server to the client computer and that can be read out and executed by a computer, has been stored,
- wherein, when a fault occurs in the server, the client computer enters a stand-by mode for waiting for a start of the server, and the started server performs a control so as to receive the job information from the client computer and to reconstruct a printing order based on the received job information.

24. A medium according to claim 23, wherein the server always stores the job information in a storage unit, and, when a fault occurs in the server, the client computer enters a stand-by mode for waiting for a start of the server, and the started server controls so as to reconstruct job information based on the recorded job information.

25. An information processing apparatus comprising:
- a transmission unit adapted to transmit job information of print data to a server;
- a spool unit adapted to spool the print data;
- an order control unit adapted to control a printing order based on the job information transmitted by said transmission unit; and
- a sending unit adapted to send transmission possible information, indicating that the print data can be transmitted to a printer, to a client computer, wherein said information processing apparatus functions as a client computer that includes said transmission unit and said spool unit, and, when a fault occurs in the server, said information processing apparatus plays a role of the server.

26. An apparatus according to claim 25, wherein said information processing apparatus has been preset as a reserve server.

27. An apparatus according to claim 26, wherein when said information processing apparatus set as the reserve server cannot operate, said information processing apparatus notifies the server of a message that it resigns a right as a reserve server.

28. An information processing apparatus comprising:
   an order control unit adapted to control a printing order based on job information transmitted from a client computer;
   a sending unit adapted to send transmission possible information, indicating that print data can be transmitted to a printer, from a server to the client computer; and
   a right giving unit adapted to give a right as a reserve server to the client computer.

29. An apparatus according to claim 28, wherein said right giving unit sets the client computer as a reserve server based on an order of turn-on of a power supply in the client computer.

30. An apparatus according to claim 28, further comprising a detection unit adapted to detect a fault of the client computer, and wherein, when it is detected by said detection unit that there is a fault in the client computer set as the reserve server, another client computer is newly set as a reserve server by said right giving unit.

31. An information processing apparatus comprising:
   an order control unit adapted to control a printing order based on job information transmitted from a client computer; and
   a sending unit adapted to send transmission possible information, indicating that print data can be transmitted to a printer, to the client computer,
   wherein, when a fault occurs in said information processing apparatus and said information processing apparatus is restarted, the job information is received from the client computer and a printing order is reconstructed.

32. An apparatus according to claim 31, further comprising a recording unit adapted to always store the job information, and wherein, when a fault occurs in said information processing apparatus and said information processing apparatus is restarted, job information is reconstructed based on the job information stored in said recording unit.

33. A control method of an information processing apparatus, comprising:
   a transmitting step of transmitting job information of print data to a server;
   a spooling step of spooling the print data to a spool unit;
   an order control step of controlling a printing order based on the job information transmitted in said transmitting step; and
   a sending step of sending transmission possible information, indicating that the print data can be transmitted to a printer, to a client computer,
   wherein the information processing apparatus is allowed to function as the client computer, and, when a fault occurs in the server, the information processing apparatus is controlled so as to play a role of the server.

34. A method according to claim 33, wherein the information processing apparatus has been preset as a reserve server.

35. A method according to claim 34, wherein when the information processing apparatus set as the reserve server cannot operate, the information processing apparatus notifies the server of a message that it resigns a right as a reserve server.

36. A method of controlling an information processing apparatus, comprising:
   an order control step of controlling a printing order based on job information transmitted from a client computer;
   a sending step of sending transmission possible information, indicating that print data can be transmitted to a printer, to the client computer; and
   a right giving step of giving a right as a reserve server to the client computer.

37. A method according to claim 36, wherein in said right giving step, the client computer is set as a reserve server based on an order of turn-on of a power supply in the client computer.

38. A method according to claim 36, further comprising a detecting step of detecting a fault of the client computer, and wherein, when it is detected in said detecting step that there is a fault in the client computer set as the reserve server, another client computer is newly set as a reserve server in said right giving step.

39. An information processing method of controlling an information processing apparatus, comprising:
   an order control step of controlling a printing order based on job information transmitted from a client computer; and
   a sending step of sending transmission possible information, indicating that print data can be transmitted to a printer, to the client computer,
   wherein, when a fault occurs in the information processing apparatus and the information processing apparatus is restarted, the job information is received from the client computer and a printing order is reconstructed.

40. A method according to claim 39, wherein the information processing apparatus includes a recording unit adapted to always store the job information, and, when a fault occurs in the information processing apparatus and the information processing apparatus is restarted, job information is reconstructed based on the job information stored in the recording unit.

41. A computer readable medium storing instructions for causing a computer to perform a method, the method comprising:
   a transmitting step of transmitting job information of print data to a server;
   a spooling step of spooling the print data to a spool unit;
   an order control step of controlling a printing order based on job information transmitted in said transmitting step; and
   a sending step of sending transmission possible information, indicating that the print data can be transmitted to a printer, from the server to a client computer,
   wherein the information processing apparatus is allowed to function as the client computer, and, when a fault occurs in the server, the information processing apparatus is controlled so as to play a role of the server.

42. A medium according to claim 41, wherein the information processing apparatus has been preset as a reserve server.

43. A medium according to claim 42, wherein, when the information processing apparatus set as the reserve server cannot operate, the information processing apparatus notifies the server of a message that it resigns a right as a reserve server.

44. A computer readable medium storing instructions for causing a computer to perform a method, the method comprising:

an order control step of controlling a printing order based on job information transmitted from a client computer;

a sending step of sending transmission possible information, indicating that print data can be transmitted to a printer, from a server to the client computer; and a right giving step of giving a right as a reserve server to the client computer.

45. A medium according to claim 44, wherein in said right giving step, the client computer is set as a reserve server based on an order of turn-on of a power supply in the client computer.

46. A medium according to claim 44, wherein said method further comprises a detecting step of detecting a fault of the client computer, and, when it is detected in said detecting step that there is a fault in the client computer set as the reserve server, another client computer is newly set as a reserve server in said right giving step.

47. A computer readable medium storing instructions for causing a computer to perform a method, the method comprising:

an order control step of controlling a printing order based on job information transmitted from a client computer; and a sending step of sending transmission possible information, indicating that print data can be transmitted to a printer, from a server to the client computer has been stored, wherein, when a fault occurs in an information processing apparatus and the information processing apparatus is restarted, the job information is received from the client computer and a printing order is reconstructed.

48. A medium according to claim 47, wherein the information processing apparatus includes a recording unit adapted to always store the job information, and, when a fault occurs in the information processing apparatus and the information processing apparatus is restarted, job information is reconstructed based on the job information stored in the recording unit.

49. A computer program product, which includes instructions on a computer-readable medium for implementing a control method of an information processing apparatus, wherein the instructions are to be executed by a computer, comprising:

program code for transmitting job information of print data to a server;

program code for spooling the print data to a spool unit;

program code for controlling a printing order based on the job information transmitted by said program code for transmitting; and program code for sending transmission possible information, indicating that the print data can be transmitted to a printer, to a client computer, wherein the information processing apparatus is allowed to function as the client computer, and, when a fault occurs in the server, the information processing apparatus is controlled so as to play a role of the server.

50. A program product according to claim 49, wherein the information processing apparatus has been preset as a reserve server.

51. A program product according to claim 50, wherein when the information processing apparatus set as the reserve server cannot operate, the information processing apparatus notifies the server of a message that it resigns a right as a reserve server.

52. A computer program product, which includes instructions on a computer-readable medium for implementing a method of controlling an information processing apparatus, wherein the instructions are to be executed by a computer, comprising:

program code for controlling a printing order based on job information transmitted from a client computer;

program code for sending transmission possible information, indicating that print data can be transmitted to a printer, to the client computer; and program code for giving a right as a reserve server to the client computer.

53. A program product according to claim 52, wherein the client computer is set as a reserve server based on an order of turn-on of a power supply in the client computer.

54. A program product according to claim 52, further comprising program code for detecting a fault of the client computer, and wherein, when it is detected by said program code for detecting that there is a fault in the client computer set as the reserve server, another client computer is newly set as a reserve server by said program code for giving a right.

55. A computer program product, which includes instructions on a computer-readable medium for implementing an information processing method for controlling an information processing apparatus, wherein the instructions are to be executed by a computer, comprising:

program code for controlling a printing order based on job information transmitted from a client computer; and program code for sending transmission possible information, indicating that print data can be transmitted to a printer, to the client computer, wherein, when a fault occurs in the information processing apparatus and the information processing apparatus is restarted, the job information is received from the client computer and a printing order is reconstructed.

56. A program product according to claim 55, wherein the information processing apparatus includes a recording unit adapted to always store the job information, and, when a fault occurs in the information processing apparatus and the information processing apparatus is restarted, job information is reconstructed based on the job information stored in the recording unit.

* * * * *